3,118,861
NEODYMIUM OXIDE AS CATALYST FOR PREPARING ESTERS
Maria V. Wiener, Akron, Ohio, assignor to The Goodyear Tire and Rubber Company, Akron, Ohio, a corporation of Ohio
No Drawing. Filed Oct. 26, 1961, Ser. No. 147,717
9 Claims. (Cl. 260—75)

This invention relates to the preparation of polymeric glycol esters of polycarboxylic acids. More particularly this invention relates to an improvement in the method of preparing linear superpolyesters by the alcoholysis of esters of polycarboxylic acids with a glycol and the subsequent polymerization of these glycol esters to high polymeric linear polyesters.

In the preparation of linear superpolyesters one of the most satisfactory methods from the standpoint of simplicity of reaction and economy of operation has been the ester interchange method in which esters of polycarboxylic acids are reacted with a glycol to form the glycol ester of the acid or a low molecular weight polymeric polyester which is then polymerized to a high molecular weight polymeric polyester by a condensation reaction with splitting out of glycol. This process, however, has not been entirely satisfactory because the initial ester interchange reaction is slow and because most of the materials that catalyze this reaction are not effective catalysts for the subsequent condensation reaction.

In order to prepare linear polyesters of high molecular weight it is necessary to use materials of high purity because some impurities interfere with the condensation reaction and lower the degree of polymerization to which the glycol ester can be polymerized. Very pure esters, however, do not undergo the alcoholysis reaction with pure glycols as readily as do these materials containing some impurities. Consequently, it has been necessary to find a material which will effectively catalyze the ester interchange of pure esters with pure glycols, and will not adversely affect the condensation reaction, so that high molecular weight polyesters can be formed in a reasonable time. Preferably the catalyst for the initial ester interchange reaction should also be a catalyst for the condensation reaction.

Heretofore, various materials have been proposed as catalysts for the ester interchange reaction between glycols and esters of polycarboxylic acids and for the subsequent polymerization or condensation reaction. Metals in the form of powder, chips, ribbon, or wire have been suggested, as have surface catalysts such as broken glass or silica gel. The more successful of the catalysts used in the past, however, have been materials such as the alkali metal and alkaline earth metal alcoholates, the alkali metal carbonates, alkaline earth oxides, and litharge.

Many of these materials are effective catalysts for the initial, simple ester interchange, and some of them catalyze the condensation reaction. However, there are certain disadvantages to using these materials due primarily to the nature of their physical or chemical properties. The metals and surface catalysts, being present in the form of solids, incompatible with the polymer, must be removed before the polymer can be used in applications such as fibers, coatings, or films. Removal of solid particles from very viscous materials such as these high molecular weight polyesters is extremely difficult. Alkaline materials, when present in the polymerization stage, generally have an adverse effect on the formation of large molecules and have been found to accelerate the discoloration and depolymerization of highly polymeric polyesters.

According to this invention the ester interchange between glycols and esters of polycarboxylic acids and the subsequent polymerization of the ester interchange product to superpolyesters by the elimination of glycol is accelerated by neodymium oxide. The final products are linear polymers of high molecular weight.

For example, esters such as terephthalate or isophthalate esters or a mixture thereof can be reacted with a glycol and the resultant glycol ester condensed to form a polymer, both stages of the reaction being carried out in the presence of neodymium oxide. The bis glycol ester may be prepared by any suitable method such as by reacting the sodium or potassium salt of the acid with ethylene chlorohydrin or by reacting the acid with a large excess of the glycol or by ester interchange using a catalyst for the ester interchange but which is not a catalyst for the polymerization reaction. The bis ester or low molecular weight polymer thereof can then be polymerized according to the usual known techniques using neodymium oxide as the catalyst.

The practice of the invention is illustrated by the following examples.

*Example 1*

A glass reaction vessel in the shape of a tube approximately 35 centimeters long having an inside diameter of 38 millimeters, having a side arm, and equipped with a nitrogen gas inlet tube and a stirrer was charged with 58.2 grams of dimethyl terephthalate, 41 grams of ethylene glycol, and 0.015 gram of neodymium oxide. The reactants were stirred and heated at 217° C. by means of a vapor bath boiling at this temperature while a slow stream of oxygen-free nitrogen was passed over the reaction mixture. The theoretical amount of methanol distilled out during one and one-half hours. When the alcoholysis was complete the mixture was heated at 245° C. and the pressure in the system was slowly reduced over a period of 45 minutes to one millimeter of mercury pressure while the excess glycol distilled out. Then the temperature was raised to 280° C. After 2¾ hours heating at 280° C. and one millimeter of mercury pressure the polymer formed had an intrinsic viscosity of 0.467.

*Example 2*

Fifty and eight-tenths grams of catalyst-free bis-hydroxyethyl terephthalate (0.2 mol) and 0.0165 gram neodymium oxide were placed in a reaction vessel of the type used in Example 1. The mixture was stirred and heated in nitrogen atmosphere at 245° C. bath until the neodymium oxide dissolved in the mixture. Then the pressure was slowly reduced over a period of 45 minutes to 1 millimeter of mercury pressure while a slow stream of oxygen-free nitrogen was passed over the reaction mixture and excess glycol distilled out. Then the temperature was raised to 280° C. After two hours heating at 280° C. and one millimeter of mercury pressure the polymer formed had an intrinsic viscosity of 0.549.

*Example 3*

Fifty-eight and two-tenths grams of dimethyl terephthalate, forty-one grams of ethylene glycol, 0.015 gram of neodymium oxide, and 0.015 gram antimony trioxide were reacted according to the procedure used in Example 1. After two hours of condensation at 280° C. and 1 millimeter of mercury pressure the polymer formed had an intrinsic viscosity of 0.612

The intrinsic viscosities were determined at 30° C. by dissolving the samples in a mixture containing 60% phenol and 40% symmetrical tetrachloroethane, and timing the flow of the solution in a No. 1 Ubbelohde viscosimeter. The relative viscosity is the quotient of this time divided by the flow time of the solvent alone. Sufficient sample was used to give a concentration of approximately 0.4 gram per 100 cubic centimeters of solution. The Billmeyer equation used to calculate the intrinsic viscosity is as follows:

$$[\eta] = \tfrac{3}{4}\frac{\ln \eta r}{c} + \tfrac{1}{4}\frac{\eta sp}{c}$$

where:

$[\eta]$ = intrinsic viscosity
$\eta r$ = relative viscosity
$\eta sp$ = specific viscosity = $\eta r - 1$
$c$ = concentration in grams/100 cubic centimeters In the practice of the invention, the preparation of the glycol ester and its subsequent polymerization is, in general, carried out in accordance with the usual known techniques. Thus, in the ester interchange it is customary and desirable to use an excess of glycol. Also, the reaction is preferably carried out in the absence of oxygen, generally in an atmosphere of an inert gas such as nitrogen or the like, in order to lessen darkening and to make is possible to obtain a high molecular weight pale or colorless product. The polymerization or condensation reaction is carried out under reduced pressure, generally below 10 millimeters of mercury pressure and usually at or below 1 millimeter of mercury pressure at a temperature in the range of from 260 to 290° C.

In the production of highly polymeric linear polymers from esters of a polycarboxylic acid and a glycol, neodymium oxide can act as catalyst for the initial ester interchange reaction as well as for the condensation polymerization reaction. However, if desired, neodymium oxide can be used only in the condensation reaction. Thus, the glycol esters can be prepared by ester interchange or other suitable method and the neodymium oxide can be added to the glycol esters and the condensation polymerization reaction carried out. Also neodymium oxide can be added to a low molecular weight polymer of a glycol ester or to a mixture of a low molecular weight polymer and a glycol ester such as a mixture of a polymer of a bis glycol ester of a dicarboxylic acid and the bis glycol ester of the acid and the polymerization reaction carried out to prepare the polymeric ester.

Neodymium oxide can be used as the sole catalyst for the ester interchange and condensation reactions, or, if desired, small amounts of another catalyst can be used to increase the rate of reaction and to assist in obtaining a polyester of higher viscosity in shorter reaction times. Thus small amounts of other catalysts such as manganous acetate, zinc acetate, lead oxide, or antimony trioxide, for example, can be used in conjunction with the catalyst of this invention.

The amount of neodymium oxide used may be varied over wide concentrations. As is usual with catalysts, the amount will ordinarily be relatively small. As a general rule, the amount will be within the range of from 0.0005 to 1.0% by weight, based on the ester of the polycarboxylic acid. The preferred range is 0.005 to 0.05% by weight, based on the ester of the polycarboxylic acid used, to give a satisfactory reaction rate and a product of suitable viscosity and color.

The examples given illustrate the invention, particularly with respect to the dimethyl esters of terephthalic acid and ethylene glycol. The catalysts of the invention are effective with other esters such as the ethyl, propyl, butyl and phenyl esters of the phthalic acids and other aromatic and aliphatic acids. Thus the invention is applicable also to the manufacture of linear polyesters derived from other acids and/or other glycols. Representative examples of other acids are aliphatic acids of the general formula

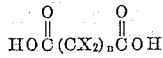

where X is hydrogen or a low alkyl group and $n$ is zero to ten such as oxalic acid, malonic acid, succinic acid, glutaric acid, adipic acid, sebacic acid, suberic acid, etc.; methyl succinic acid, α-methyl adipic acid; aromatic acids such as the phthalic acids, the naphthalic acids, the diphenyl dicarboxylic acids; and araliphatic acids such as α,β-diphenyl ethane-4,4'-dicarboxylic acid, α,δ-diphenyl butane 4,4'-dicarboxylic acid. Representative examples of other glycols that can be used are the propylene glycols, the butylene glycols, pentamethylene glycol, decamethylene glycol, alkyl substituted polymethylene glycols such as 2,2-dimethyl 1,3-propane diol, 2,2-diethyl 1,3-propane diol, diethylene glycol, 2,2-bis[4-(beta-hydroxyethoxy) phenyl]propane and cyclohexane dimethanol. The phthalic acids and ethylene glycol are preferred because of their low cost and ready availability. Thus, in a preferred embodiment ethylene glycol is reacted with a bis ester of at least one acid selected from the group consisting of terephthalic and isophthalic acid and the resulting glycol ester condensed to form a high molecular weight linear polyester in the presence of the catalyst of the invention.

While certain representative embodiments and details have been shown for the purpose of illustrating the invention, it will be apparent to those skilled in this art that various changes and modifications may be made therein without departing from the spirit or scope of the invention.

I claim:

1. In a process for preparing a polymeric linear polyester by subjecting at least one ester selected from the group consisting of methyl, ethyl, propyl, butyl and phenyl esters of an organic dicarboxylic acid to alcoholysis in the presence of an excess of a glycol and thereafter condensing the glycol ester with the removal of glycol, the improvement which comprises carrying out both the alcoholysis and condensation in the presence of a catalytic amount of neodymium oxide.

2. In a process for preparing a polymeric linear polyester by the self-condensation, with the removal of glycol, of a glycol ester of an organic dicarboxylic acid, the improvement which comprises carrying out said condensation in the presence of a catalytic amount of neodymium oxide.

3. In a process for preparing a polymeric ethylene glycol ester of a phthalic acid from the group consisting of isophthalic and terephthalic acids by subjecting a bis ester of the acid selected from the group consisting of methyl, ethyl, propyl, butyl and phenyl esters of the acid to alcoholysis in the presence of ethylene glycol and thereafter condensing the bis ethylene glycol ester, with the removal of ethylene glycol, the improvement which comprises carrying out both the alcoholysis and condensation in the presence of a catalytic amount of neodymium oxide.

4. In a process for preparing a polymeric linear ethylene glycol copolyester of isophthalic acid and terephthalic acid by subjecting a mixture of esters of said acids to alcoholysis in the presence of ethylene glycol and thereafter condensing the bis ethylene glycol ester, with the removal of ethylene glycol, the improvement which comprises carrying out both the alcoholysis and condensation in the presence of a catalytic amount of neodymium oxide.

5. In a process for preparing polymeric ethylene terephthalate by subjecting dimethyl terephthalate to alcoholysis in the presence of ethylene glycol and thereafter condensing the bis ethylene glycol ester thus formed, with the removal of ethylene glycol, the improvement which comprises carrying out both the alcohlysis and condensation in the presence of a catalytic amount of neodymium oxide.

6. In a process for preparing polymeric ethylene isophthalate by subjecting dimethyl isophthalate to alcoholysis in the presence of ethylene glycol and thereafter condensing the bis ethylene glycol ester thus formed, with the removal of ethylene glycol, the improvement which comprises carrying out both the alcoholysis and condensation in the presence of a catalytic amount of neodymium oxide.

7. In a process for preparing a polymeric polyester by condensation with the removal of glycol, of a glycol ester of at least one acid selected from the group consisting of terephthalic acid and isophthalic acid, the improvement which comprises carrying out said condensation in the presence of neodymium oxide.

8. A process according to claim 1 in which the neodymium oxide is used in amount of 0.0005 to 0.05% of the ester of the polycarboxylic acid.

9. In the process of preparing a bis glycol ester of an organic dicarboxylic acid by subjecting at least one ester of the acid selected from the group consisting of methyl, ethyl, propyl, butyl and phenyl esters to alcoholysis in the presence of an excess of a glycol and removing the monohydric alcohol formed the improvement which comprises carrying out the alcoholysis reaction in the presence of a catalytic amount of neodymium oxide.

References Cited in the file of this patent

UNITED STATES PATENTS

| | | |
|---|---|---|
| 2,578,660 | Auspos | Dec. 18, 1951 |
| 2,729,620 | Sullivan | Jan. 3, 1956 |